US009797261B2

United States Patent
Tibbott et al.

(10) Patent No.: US 9,797,261 B2
(45) Date of Patent: Oct. 24, 2017

(54) INTERNAL COOLING OF ENGINE COMPONENTS

(71) Applicant: ROLLS-ROYCE PLC, London (GB)

(72) Inventors: Ian Tibbott, Lichfield (GB); Peter Thomas Ireland, Oxford (GB); Anthony John Rawlinson, Derby (GB); Irene Cresci, Oxford (GB)

(73) Assignee: ROLLS-ROYCE plc, London (GB)

( * ) Notice: Subject to any disclaimer, the term of this patent is extended or adjusted under 35 U.S.C. 154(b) by 154 days.

(21) Appl. No.: 14/846,284

(22) Filed: Sep. 4, 2015

(65) Prior Publication Data

US 2016/0097286 A1 Apr. 7, 2016

(30) Foreign Application Priority Data

Oct. 3, 2014 (GB) .................................. 1417476.7

(51) Int. Cl.
*F01D 5/18* (2006.01)
*F01D 9/04* (2006.01)
*F01D 9/06* (2006.01)

(52) U.S. Cl.
CPC ............. *F01D 5/188* (2013.01); *F01D 5/189* (2013.01); *F01D 9/041* (2013.01); *F01D 9/065* (2013.01);
(Continued)

(58) Field of Classification Search
CPC .......... F01D 5/188; F01D 5/189; F01D 9/041; F01D 9/065; F01D 5/187; F01D 9/02;
(Continued)

(56) References Cited

U.S. PATENT DOCUMENTS

2010/0124485 A1* 5/2010 Tibbott .................. F01D 5/188
    415/115
2014/0093390 A1 4/2014 Pointon et al.

FOREIGN PATENT DOCUMENTS

EP 0182588 A1 5/1986
EP 0869260 A2 10/1998
(Continued)

OTHER PUBLICATIONS

Mar. 13, 2015 Search Report issued in British Application No. 1417476.7.
(Continued)

*Primary Examiner* — Dwayne J White
*Assistant Examiner* — Justin Pruitt
(74) *Attorney, Agent, or Firm* — Oliff PLC

(57) ABSTRACT

A gas turbine engine component, especially an aerofoil-sectioned nozzle guide vane (NGV), having at least one internal cooling chamber for passage of cooling air, the chamber including leading edge portion and one inlet portion via which cooling air may enter the chamber from feed source, wherein the component includes a partitioning element, e.g. curved or scoop-shaped partitioning plate or wall, provided in the chamber inlet portion and defining within the inlet portion a sub-chamber adjacent the leading edge portion, and wherein partitioning element is configured so the cooling air velocity in the sub-chamber is less than the cooling air velocity in the remainder of inlet portion. The reduced velocity of the cooling air in the sub-chamber adjacent the leading edge serves to increase pressure therein, thereby maintaining desired backflow pressure margin between the feed pressure of the cooling air delivered to the showerhead holes and the gas-path from the combustor.

16 Claims, 11 Drawing Sheets

(52) U.S. Cl.
CPC .. *F05D 2240/126* (2013.01); *F05D 2240/127* (2013.01); *F05D 2260/201* (2013.01); *F05D 2260/2212* (2013.01); *F05D 2260/22141* (2013.01); *Y02T 50/673* (2013.01); *Y02T 50/676* (2013.01)

(58) Field of Classification Search
CPC ......... F05D 2240/126; F05D 2260/201; F05D 2260/2212; F05D 2260/22141; Y02T 50/673; Y02T 50/676
See application file for complete search history.

(56) References Cited

FOREIGN PATENT DOCUMENTS

| | | |
|---|---|---|
| EP | 1 136 651 A1 | 9/2001 |
| EP | 2149676 A1 | 2/2010 |
| GB | 2 405 451 A | 3/2005 |

OTHER PUBLICATIONS

Feb. 24, 2016 Search Report issued in European Patent Application No. 15 18 3905.

* cited by examiner

INTERNAL COOLING OF ENGINE COMPONENTS

TECHNICAL FIELD

This invention relates to the internal cooling of components in an engine, especially a gas turbine engine. More particularly, though not exclusively, the invention relates to improvements in the flow characteristics of cooling air fed into such engine components by modifying the geometry of the cooling air feed arrangement.

BACKGROUND OF THE INVENTION AND PRIOR ART

In gas turbine engines the performance of the basic engine cycle, whether measured in terms of efficiency or specific output, is improved by increasing the turbine gas temperature. It is therefore desirable to operate the turbine at the highest possible temperature. For any engine cycle compression ratio or bypass ratio, increasing the turbine entry gas temperature will always produce more specific thrust (e.g. engine thrust per unit of air mass flow). However as turbine entry temperatures increase, the lifespan of an uncooled turbine falls, necessitating the development of better materials and the introduction of internal air cooling for many of its components.

In modern gas turbine engines the high pressure (HP) turbine gas temperatures are now much hotter than the melting point of the turbine blade materials commonly used, which therefore necessitates efficient cooling of the HP turbine components. In some engine designs the intermediate pressure (IP) and low pressure (LP) turbines are also cooled. During its passage through the turbine the mean temperature of the gas stream decreases as power is extracted. Therefore the need to cool the static and rotary parts of the engine structure decreases as the gas moves from the HP stage(s) through the IP and LP stages towards the exit nozzle.

Internal convection and external films are the primary methods of cooling the gas-path components, for example aerofoils, platforms, shrouds and shroud segments. HP turbine nozzle guide vanes (NGVs) in particular consume the greatest amount of cooling air in high temperature engines. Typical NGVs comprise forward and rear cavities for passage of cooling air therethrough. HP turbine blades typically use about half of the NGV flow, whereas the IP and LP stages downstream of the HP turbine use progressively less cooling air.

FIG. 1 of the accompanying drawings is an isometric cut-away view of a typical single-stage cooled gas turbine engine 1, showing the NGVs 2 (with their respective aerofoils 3), turbine rotor blades 4 (with their respective aerofoils 5), inner and outer platforms 6, 8, HP turbine disc 10, and pre-swirl nozzles 12, as well as the cover-plates and lock plates arrangements including HP turbine support casing 14 and shroud segments 16.

The HPT blades 4 and NGVs 2 are cooled by using high pressure (HP) air from the compressor that has by-passed the combustor and is therefore relatively cool compared with the gas temperature. Typical cooling air temperatures are in the range of from about 800 to about 1000 K. Gas temperatures can be in excess of about 2100 K.

The cooling air from the compressor that is used to cool the hot turbine components is not used fully to extract work from the turbine. Extracting coolant flow therefore has an adverse effect on the engine operating efficiency. It is thus important to use this cooling air as effectively as possible.

In modern engines the ever increasing gas temperature level combined with a drive towards flatter combustion radial profiles (in the interests of reduced combustor emissions) have resulted in an increase in local gas temperatures experienced by the NGV aerofoils and their platforms. However, the increased coolant flow levels required to accommodate these changes in local gas temperature have a detrimental effect on the local feed pressure supplying the internal cooling holes of the NGV aerofoils 3. In order to maintain a safe backflow pressure margin, higher pressure drop levels across the combustor are becoming a necessity.

The last ~10 years has seen a significant rise in the inlet gas temperature and overall engine pressure ratio in newer engine designs, and this has brought a new raft of problems in the turbine section of the engine. The turbine life is typically limited by the lives of the hot section aerofoil components. The HPT NGVs are subject to the hottest gas temperatures and thus consume the highest quantity of cooling flow in order to ensure mechanical integrity.

A leading edge (L/E) region of each NGV aerofoil is also subject to the highest local levels of external heat transfer coefficients, and therefore the L/E region requires special treatment in terms of convective cooling levels. The most commonly employed arrangement involves the provision of plural rows of very steeply inclined cooling holes, located very close together, such as at 20 in FIG. 1. This arrangement is known as a "showerhead", and its operation is known as "showerhead cooling".

The coolant air flow levels passing through these showerhead holes dictate the rate of heat removal from the L/E region. However the pressure ratio across these cooling holes is not very high, and therefore under some engine conditions there is a danger of hot gas ingestion into at least the forward cooling cavity of the NGV. If this occurs then the consequences can be disastrous, owing to the resulting failure to provide the necessary cooling. The most likely location where this situation may occur is at the entrance to the forward NGV cooling chamber that feeds the showerhead cooling holes. This is because the flow level at the entrance is at a maximum value compared with the flow area of the feed passage. Consequently the flow velocity, or Mach number, of the coolant air flow is at its highest value in this region and thus the corresponding static feed pressure is at its lowest value. Hence the local pressure ratio across the showerhead cooling holes is also at its lowest level. In order to guarantee that no hot gas is ingested, the "backflow margin" is generally set to a value in the range of about 1.5 to about 2.0%, depending on the confidence levels associated with the pressure data and the familiarity of the cooling geometry. The backflow margin is defined as:

$$\text{backflow margin} = (P_{static\ feed} - P_{40})/P_{40} \times 100\%,$$

where $P_{static}$ feed is the pressure of the coolant air flow entering the NGV forward cooling chamber and $P_{40}$ is the pressure of the hot gas flow exiting the combustor.

The cooling holes located on either side of an aerofoil stagnation point are most at risk. The stagnation point tends to move around due to unsteadiness of the flow, and therefore a stagnation region is created where the local static feed pressure of the coolant air flow is equal to the total gas flow pressure $P_{t40}$.

In order to ensure that the static feed pressure never falls too low, the leading edge feed passage is generally divided into two separate feed chambers and these have separate coolant air supplies: one fed from the outboard side and the other fed from the inboard side. In addition the respective entrances to these feed passages are generally shaped like the mouth of a bell (i.e. "bell-mouthed") in order to keep the entrance losses to a minimum.

FIGS. 2(a) and 2(b) of the accompanying drawings show one example of the above typical known arrangement of HPT NGV aerofoils 3, internal cooling geometry and coolant feed systems. FIG. 2(a) is a cross-sectional view of a typical HPT NGV aerofoil cooling scheme with forward 3F and rearward 3R cooling chambers. The forward chamber 3F is a dual feed system, i.e. fed from both outboard and inboard sources, whereas the rear chamber 3R is fed from the inboard source only. FIG. 2(b) is an isometric cut-away view of the NGV aerofoil segment showing the internal cooling scheme features and coolant flows, which are as follows: 30 represents the forward chamber outboard coolant air feed to the leading-edge showerhead holes from which the coolant air exits as at 20; 32 represents the forward chamber inboard coolant air feed; 34 represents the rear chamber inboard (only) coolant air feed; 36 represents an impingement plate having holes therein through which coolant air passes from the rearward chamber 3R to cool the rear side section of the NGV aerofoil; 38 represents cooling air exiting the rear trailing edge of the aerofoil via slots in a pedestal bank, and 39 represents film cooling of exited air from the showerhead holes across the exterior surface of the aerofoil 3. Also shown is a sheet metal baffle plate 35 within the forward chamber 3F for preventing the inboard or outboard coolant sources from dominating the coolant feed system.

This design shown in FIGS. 2(a) and (b) is an example of the simplest of forward cooling chambers 3F, with no heat transfer augmentation features, and fed from both inboard and outboard coolant sources. Also for simplicity the entrances to the forward 3F and rearward 3R chambers are shown here as sharp-edged, with no "bell-mouth" shape.

FIG. 3(a) of the accompanying drawings is a cross-sectional view through another example of a known HP turbine NGV aerofoil cooling scheme, where the NGV aerofoil 3 again comprises forward 3F and rearward 3R cooling chambers. However these chambers differ from those shown in FIGS. 2(a) and 2(b) in that they have mounted therein respective sheet metal impingement tubes 43F, 43R, which are inserted therein from one end (outboard or inboard) and welded in place. The purpose of the impingement tubes 43F, 43R is to provide a plenum from which the coolant air is bled through a series of holes 48 as "impingement jets", generally arranged in rows, which impinge cooling air onto the inner surface of the respective cast chamber 3F, 3R. These impingement tube devices 43F, 43R enable the designer to target specific locations within the chambers 3F, 3R that correspond to the external heat load, thereby enabling specific localised cooling requirements to be optimised. The coolant air is then bled out onto the exterior surface of the aerofoil through film cooling holes machined into the casting walls, to provide a thermal barrier of cool air which insulates the metal of the aerofoil from the hot gas from the combustor. FIG. 3(a) shows the coolant air being fed into the sheet metal impingement tube inserts 43F, 43R from both inboard and outboard sources 30, 32, 34. Again, there may be provided a sheet metal baffle plate (not shown) located inside at least the forward impingement tube insert 43F for preventing the inboard or outboard coolant sources from dominating the feed system.

FIG. 3(b) of the accompanying drawings is a cross-sectional view through another example of a known HP turbine NGV aerofoil cooling scheme, again with forward and rearward cooling chambers 3F, 3R. However, in this case the chambers 3F, 3R do not contain sheet metal impingement tube inserts as in FIG. 3(a). Instead, in this design impingement cooling air is bled through impingement jets 58 in an additional internal cast wall 53F, 53R located in close proximity to the suction side walls 50 of the aerofoil. FIG. 3(b) shows the coolant air again being fed into the forward cooling chamber 3F from both inboard 32 and outboard 30 sources, while the rear chamber 3R is typically fed from one end only, usually the inboard end 34, where the cooling air is cleaner.

These known designs of NGV aerofoil cooling arrangements all suffer from various problems, shortcomings or limitations. For example:

Higher gas temperatures experienced by the NGV aerofoils result in higher coolant flow requirements. As recent modern engine designs have been developing, aerofoil shapes and sizes have not been changing in proportion to the increased coolant flow levels that are required. As a result, the local velocity of the coolant in the outboard and/or inboard feed chambers needs to increase, in particular that/those supplying the forward NGV cooling chamber that supplies the L/E showerhead holes, where local pressure levels are critical.

Dual-end feed forward cooling chambers have proved beneficial to some extent in keeping the inlet velocity (Mach no.) down to relatively low levels, but these improvements have already been offset by the increased flow demands, so any further improvement based on such features is limited.

"Bell-mouthed" entrance shapes have also played a useful part in keeping the local inlet velocity (Mach no.) at a low level by eliminating or reducing inlet separation, but again this feature only gives limited improvements.

According to current knowledge in the art, the only ways that remain for the designer to ensure that the cooling chamber feed pressure is kept at a safe level above that in the gas-path is to accommodate the increased flow requirements by designing a "fatter" aerofoil shape at the root or tip sections thereof, in order to increase the inlet flow area of the forward cooling chamber, or to increase the pressure drop across the combustor ($P_{30}$-$P_{40}$). However, both such design changes would seriously affect the efficiency of the turbine or cycle of the engine.

SUMMARY OF THE INVENTION

It is thus a primary object of the present invention to ameliorate or at least partially solve at least some of the shortcomings of the above prior art cooling arrangements and to provide an improved design of engine component in which a desired pressure margin between the feed pressure of the cooling air entering the key parts of the component and the pressure of the gas-path is more readily and assuredly maintainable.

Aspects of the present invention relate to an internally-cooled engine component, an insert for use or when used in forming (or operating or using) the component, an engine including the component, and a method of cooling an engine component.

In a first aspect the present invention provides a gas turbine engine component (2) having at least one internal cooling chamber (103F) for passage therethrough of cooling air, the said chamber (103F) including a leading edge portion (80) and at least one inlet portion (90) via which cooling air may enter the chamber (103F) from a feed source (130a, 130b), wherein the component (2) comprises a partitioning element (100) present in the chamber inlet portion (90) and extending to define a sub-chamber (150) wholly or partly within the chamber (103F) which sub-chamber (150) is bounded by the partitioning element (100) and the leading edge portion (80), the sub-chamber having a sub-chamber inlet arranged to receive cooling air from the feed source (130a, 130b)

and wherein the partitioning element (100) is configured such that the cooling air velocity in the sub-chamber (150) is less than the cooling air velocity in the remainder (160) of the inlet portion (90).

In other words, the partitioning element may alternatively be defined as being configured such that the cooling air velocity in the sub-chamber is less than the equivalent cooling air velocity in the inlet portion in the absence of the partitioning element under the same cooling air feed conditions.

The term leading edge as used herein relates to the direction of flow of work fluid through the gas turbine engine, the leading edge being the first edge of the component with which the sorking fluid comes into contact. A leading edge portion is a portion of a wall which defines the leading edge.

The "inlet portion" refers to a space into which cooling air from a feed source is first received into the chamber. It is bounded by walls of the chamber and ends in a plane where the walls end. The partitioning element extends into the inlet portion and may extend through the inlet portion into either or both of the remainder of the chamber cavity and a space just outside the chamber cavity.

In some embodiments of the invention the leading edge portion of the component may comprise a showerhead portion, the sub-chamber defined by the partitioning element being adjacent the showerhead portion. Thus in such embodiments the leading edge portion, adjacent to which is defined the sub-chamber by the partitioning element, may comprise a plurality of cooling through-holes formed in a leading edge wall of the component for passage of cooling air from the cooling chamber to the exterior of the leading edge portion.

In many embodiments of the invention the gas turbine engine component may be a component having an aerofoil shape or configuration.

In preferred embodiments the component may be a nozzle guide vane (NGV).

In some embodiments the cooling chamber having the partitioning element provided in the inlet portion thereof may be a forward chamber of a component comprising forward and rearward cooling chambers, each of the forward and rearward chambers being supplied from at least one cooling air feed source.

In some of the preceding embodiments the forward cooling chamber may be supplied from a plurality of feed sources, preferably a pair of an outboard feed source and an inboard feed source.

In practical embodiments of the invention the partitioning element may be provided in at least an inlet region of at least one cooling chamber of the component, which at least one cooling chamber is located adjacent the leading edge portion of the component, so that the partitioning element defines the said sub-chamber such that the sub-chamber is located adjacent, preferably contacting or being at least partially bound by, the leading edge portion, and in at least the inlet portion of the cooling chamber.

In some embodiments at least a portion, especially an axially outer portion ("axially" being as defined by the longitudinal axis of the cooling chamber(s) of the component, which in the case of the preferred NGV's corresponds to a general radial direction of the engine perpendicular to the engine's longitudinal axis), of the partitioning element may extend into an inlet feed passage via which cooling air enters the inlet portion of the cooling chamber from the feed source, in addition to the partitioning element being located in the inlet portion itself. A distance by which such a partitioning element may extend into such an inlet feed passage may vary, e.g. depending on the geometry of the overall arrangement. However, preferably any distance by which the partitioning element extends into the inlet feed passage is such that the formation of the characteristic sub-chamber adjacent the leading edge portion is optimised so as to produce the required lowering of the cooling air velocity in the sub-chamber compared with that of the cooling air in the remainder of the inlet portion. It may be possible for any distance by which the partitioning element extends into the inlet feed passage to be selected or adjusted to tailor the geometry of the arrangement such that the relative lowering of the cooling air velocity in the sub-chamber is to an optimum value or level.

Alternatively or additionally to any extension of the partitioning element into an inlet feed passage, in some embodiments at least a portion, especially an axially inner portion, of the partitioning element may extend into the main volume of the cooling chamber by any suitable or desired distance, in addition to it being located in the inlet portion itself of the chamber. A distance by which such a partitioning element may extend into such a main volume of the cooling chamber may vary, e.g. depending on the geometry of the overall arrangement. However, preferably any distance by which the partitioning element extends into the main volume of the cooling chamber is such that the formation of the characteristic sub-chamber adjacent the leading edge portion is optimised so as to produce the required lowering of the cooling air velocity in the sub-chamber compared with that of the cooling air in the remainder of the inlet portion. It may be possible for any distance by which the partitioning element extends into the main volume of the cooling chamber to be selected or adjusted to tailor the geometry of the arrangement such that the relative lowering of the cooling air velocity in the sub-chamber is to an optimum value or level. Also, it may be possible for the partitioning element to extend into the main volume of the cooling chamber by a distance such that it defines the said sub-chamber so that the sub-chamber incorporates the early pressure surface cooling holes in addition to the showerhead holes (in those embodiments that contain same).

In practical embodiments the partitioning element may be provided in at least the inlet portion of the cooling chamber by virtue of being mounted therein by any suitable means. For example, the partitioning element may be manufactured as a discrete element and subsequently mounted in the component at the desired location, e.g. by welding or other suitable attachment or bonding technique, to one or more sidewalls of the component. Alternatively the partitioning element may be formed integrally with the side walls of the component, e.g. by virtue of it being cast as an integral internal wall portion of the overall component wall structural arrangement during the overall (preferably) investment casting thereof. In many embodiments therefore, the partitioning element may be of the same material (e.g. the same metal or alloy) as the side walls of the component, especially that/those sidewall(s) to which it is preferably attached. Alternatively it may be of a different metal or other material.

In some embodiments the partitioning element may be mounted in the inlet portion of the cooling chamber by virtue of being mounted therein and attached to an inner side wall of the component itself. However, in other embodiments, in particular those in which the cooling chamber contains an insert tube comprising impingement holes therein for feeding cooling air to the leading edge portion of the component, the partitioning element may instead be mounted in the insert tube and attached to an inner side wall of the insert tube.

In embodiments the partitioning element may have any suitable height (measured in an axial direction corresponding to or parallel to the axial direction of the component, i.e. the length direction of the leading edge portion thereof, which in the case of the preferred NGV's corresponds to a general radial direction of the engine perpendicular to the engine's longitudinal axis), which may vary, for example depending on the extent to which the partitioning element extends into an inlet feed passage and/or into a main volume of the cooling chamber, and/or depending on the optimum geometry of the overall arrangement.

In embodiments the partitioning element may have any suitable width (measured in a transverse direction perpendicular to the aforementioned axial direction of the component, i.e. perpendicular or normal to the length direction of the leading edge portion thereof), which may vary, for example depending on the desired width of the sub-chamber to be defined thereby and/or the optimum geometry of the overall arrangement.

In some embodiments if desired or necessary the partitioning element may be sealed at one of its axial ends ("axial" here again being as defined by the longitudinal axis of the cooling chamber(s) of the component, which in the case of the preferred NGV's corresponds to a general radial direction of the engine perpendicular to the engine's longitudinal axis), preferably that opposite to the end at which cooling air enters the sub-chamber it defines, or alternatively it may be at least partially open at that one axial end in order to allow cooling air flow to leak back into the forward cooling chamber.

In embodiments of the invention the partitioning element may be of any suitable shape and/or configuration, provided it acts to reduce the cooling air velocity in the sub-chamber it defines in comparison with that in the remainder of the inlet portion or the cooling chamber itself.

In some embodiments the partitioning element may be in the form of a body, plate, wall, member or element having a cross-section or a face (especially a face which faces or is adjacentmost the leading edge portion of the component) of the desired or appropriate shape and/or configuration.

In some embodiments the partitioning element, or the cross-section or face thereof, may be non-flat. For example, it may be smoothly curved or arcuate in one or more orthogonal directions. Alternatively it may comprise two or more substantially flat sections angled (e.g. smoothly or sharply angled) with respect to each other in one or more orthogonal directions.

In some embodiments the partitioning element, or the cross-section or face thereof, may be concave in one or more orthogonal directions.

In some embodiments the partitioning element, or the cross-section or face thereof, may be part-cylindrical, e.g. of the shape of a segment of a cylinder (e.g. a circular or a non-circular or any other cross-sectioned cylinder) in one or more orthogonal directions.

In some embodiments the partitioning element, or the cross-section or face thereof, may be scoop-shaped.

Thus in some embodiments the partitioning element, or the cross-section or face thereof, may have a relatively simple shape in one or more orthogonal directions such as a planar, part-cylindrical, part-polygonal, part-spherical, part-parabolic or part-hyperbolic curve. Alternatively, in other embodiments the partitioning element, or the cross-section or face thereof, may have a more complex shape in one or more orthogonal directions derived from any combination of two or more of any of the aforesaid curves, shapes or mathematical functions.

In some embodiments the partitioning element may even comprise a plurality of sections or portions, each of which may have a shape or configuration which is independently selected from any one or more of the above-defined shapes, configurations, curves or mathematical functions or any combination thereof.

In some embodiments it may be possible for the partitioning element to be shaped and/or configured so that it directs the airflow impinging on it in one or more particular directions which may be desirable from a cooling optimisation standpoint. For instance, by aligning the airflow in the defined sub-chamber, adjacent the aerofoil leading edge portion, with the showerhead holes (where provided) fed by this sub-chamber, the dynamic head of pressure may also be used to boost the effective feed pressure of the airflow actually effecting the cooling.

In some embodiments a single partitioning element may be provided in the inlet portion of the cooling chamber, whereby a single sub-chamber is defined adjacent the leading edge portion thereof.

In other embodiments a plurality of partitioning elements may be provided in at least the inlet portion of the or any one given cooling chamber, such that a plurality of sub-chambers are defined therewithin, at least one (and preferably all) of which sub-chambers is/are located adjacent the leading edge portion.

In embodiments in which the or a given cooling chamber adjacent the leading edge portion is fed with cooling air from a plurality of feed sources, and thus has a plurality of inlet portions, it is possible for each of the inlet portions to be provided with a respective one of a plurality of partitioning elements, which may be substantially the same or different from each other in shape and/or configuration.

In embodiments where the component comprises a plurality of partitioning elements, whether in a single given cooling chamber or in respective ones of a plurality of cooling chambers, each partitioning element may have a shape and/or configuration which may be substantially the same or different from at least one or more of the others.

The present invention may be applied to a wide variety of engine components, e.g. NGVs (including both NGVs with or without showerhead cooling), aerofoils, turbine blades or any internally cooled component having a leading edge portion requiring particularly efficient cooling characteristics. Particular examples of NGV arrangements to which embodiments of the invention may be applied are described in detail further below in the context of preferred embodiments.

In a second aspect of the present invention there is provided a partitioning element for use, or when used, in forming (or operating or using) a component of a gas turbine engine, wherein the partitioning element is as defined above in relation to the component of the first aspect of the invention or any embodiment thereof.

Thus, according to this second aspect of the invention there is provided a partitioning element for use or when used in a gas turbine engine component, the component having at least one internal cooling chamber for passage therethrough of cooling air, the said chamber including a leading edge portion and at least one inlet portion via which cooling air may enter the chamber from a feed source, the partitioning element being providable in at least the chamber inlet portion of the component so as to define within at least the inlet portion a sub-chamber adjacent the leading edge portion, wherein the partitioning element is configured such that, in use, the cooling air velocity in the sub-chamber is less than the cooling air velocity in the remainder of the inlet portion.

In a third aspect of the present invention there is provided a gas turbine engine including one or more internally cooled components, the or each component being a component according to the first aspect of the invention or any embodiment thereof.

In a fourth aspect of the present invention there is provided a method of cooling a leading edge portion (80) of a component (2) of a gas turbine engine, the component (2) having at least one internal cooling chamber (103F) for passage therethrough of cooling air, the said chamber (103F) including a leading edge portion (80) and at least one inlet portion (90) via which cooling air may enter the chamber from a feed source (130a, 130b), wherein the method comprises:

providing a partitioning element (100) in the chamber inlet portion (90) and extending to define a sub-chamber (150) wholly or partly within the chamber (103F) which sub-chamber (150) is bounded by the partitioning element (100) and the leading edge portion (80), the sub-chamber having a sub-chamber inlet arranged to receive cooling air from the feed source (130a, 130b) the partitioning element (100) being configured such that, in use, the cooling air velocity in the sub-chamber (150) is less than the cooling air velocity in the remainder (160) of the inlet portion, and when in use, cooling the component (2) by feeding cooling air from the feed source (130a, 130b) into both the sub-chamber (150) and the chamber (103F), whereby the cooling air velocity in the sub-chamber (150) is less than the cooling air velocity in the chamber outside of the sub-chamber.

By implementation of the present invention various advantages may be attainable in comparison with operating a corresponding internally cooled engine component which does not include the characteristic partitioning element(s) as defined above. In particular the maintenance of a desired or optimum backflow pressure margin between the feed pressure of the cooling air entering the relevant cooling chamber(s) adjacent the leading edge of the component and the pressure of the gas-path is more readily and assuredly maintainable within a desired range or limits. Not only may this lead to improved cooling of the leading edge portion of the component, but as an important consequence of this it may further lead to one or more other advantages, including:

enabling a reduction in the pressure drop across the combustor ($P_{30}$-$P_{40}$);

enabling a reduction in the local thickness of the component, especially the thickness of the aerofoil section in cases where the component is an NGV or other aerofoil-shaped component;

enabling use of the resulting additional cooling air feed pressure to increase the local internal heat transfer at the leading edge of the component.

Any of the above advantages, either singly or in any combination, may lead to overall improved efficiency and performance of the engine, which may for instance manifest itself ultimately in reduced specific fuel consumption, as well as perhaps other benefits.

The above and possibly further benefits and advantages to be had from implementation of the present invention or embodiments thereof will be further apparent from the detailed description of some embodiments that follows hereinbelow.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described in detail, by way of example only, with reference to the accompanying drawings, in which.

DETAILED DESCRIPTION OF EMBODIMENTS OF THE INVENTION

Figure 1:
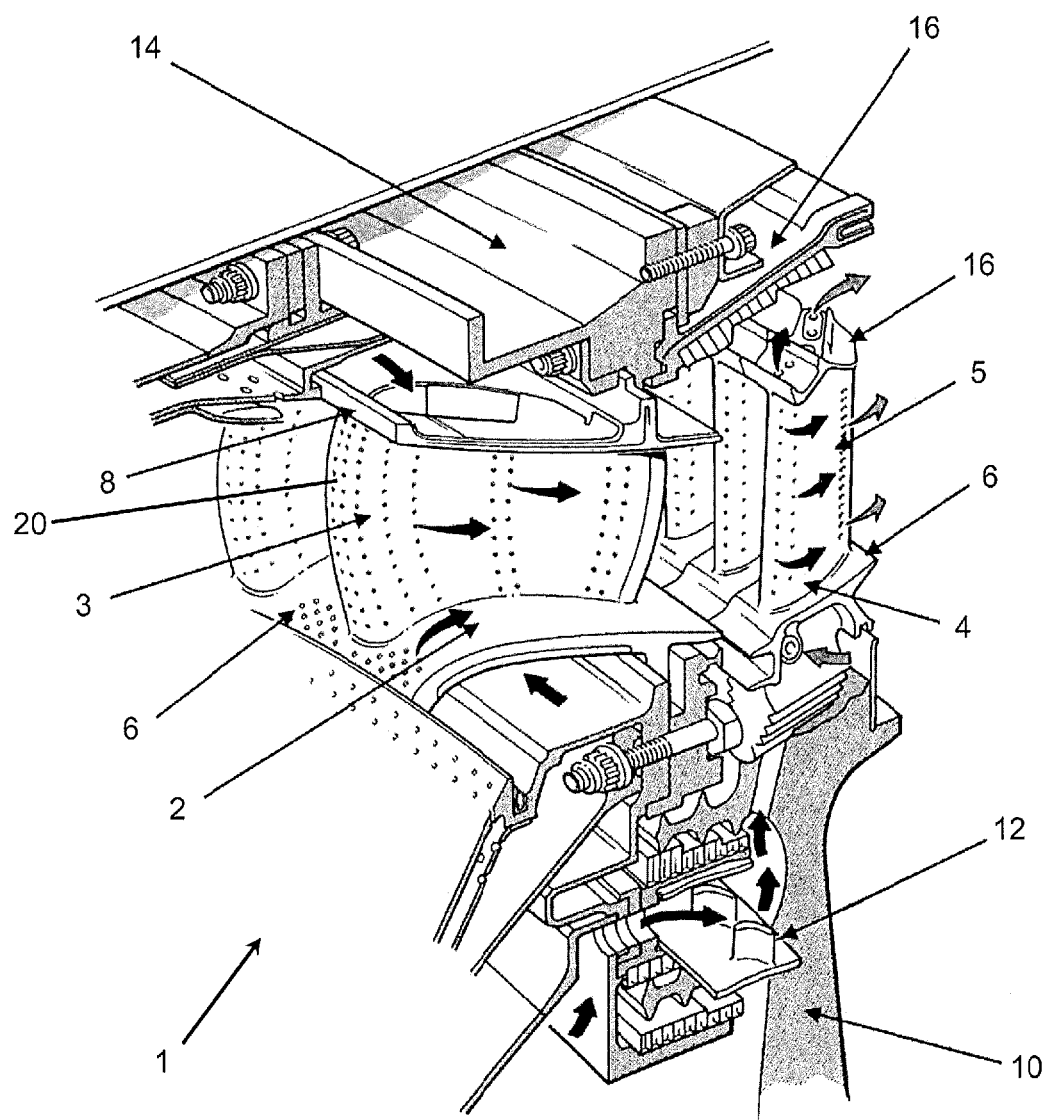
FIG. 1 is an isometric cut-away view of a typical single-stage cooled gas turbine engine showing the NGV's, rotor blades, platform structures and other components, and has already been described.
Figure 2A:
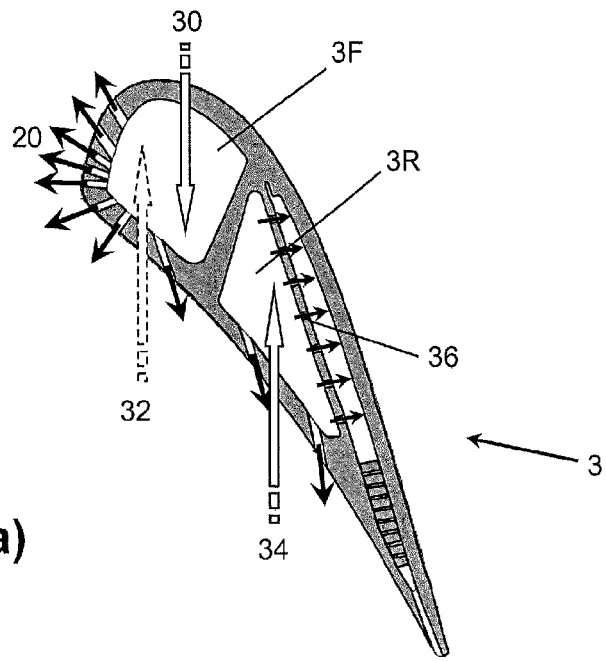
FIG. 2(a) is a cross-sectional view of a typical HPT NGV aerofoil cooling scheme with forward 3F and rearward 3R cooling chambers.
Figure 2B:
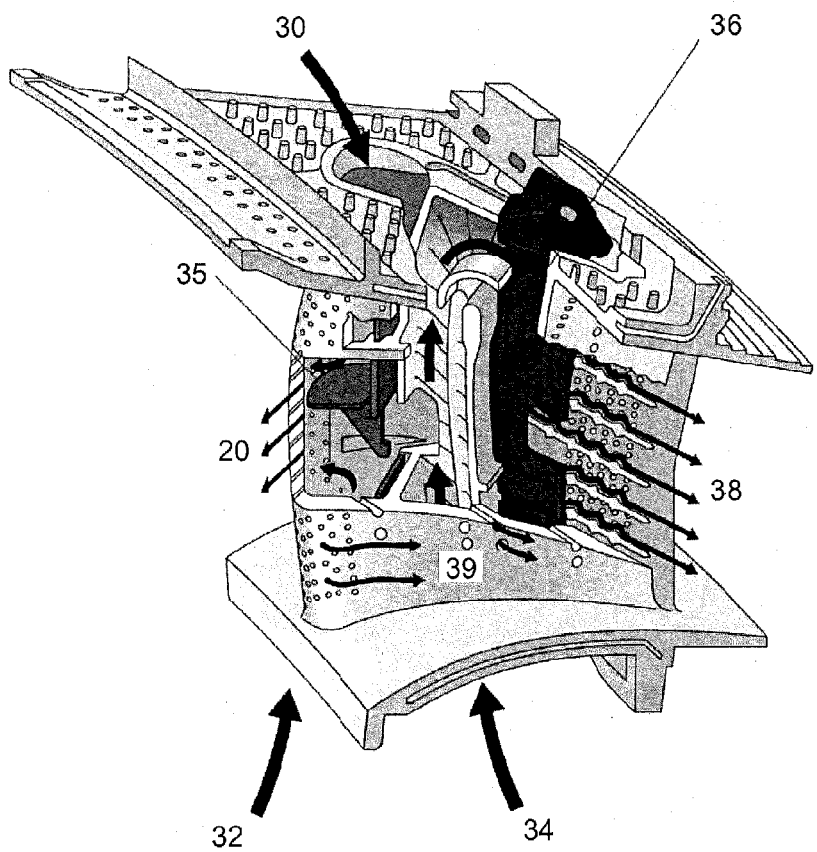
FIG. 2(b) is an isometric cut-away view of the NGV aerofoil segment showing the internal cooling scheme features and coolant flows, and both have already been described.
Figure 3A:
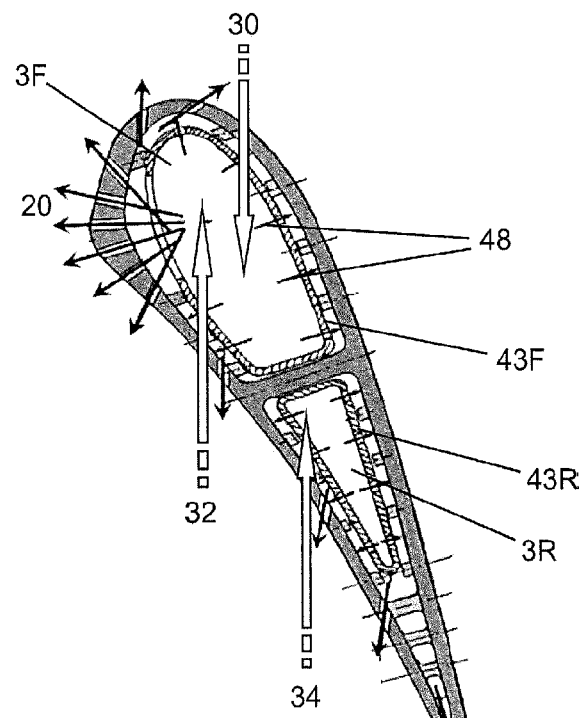
FIG. 3(a) is a cross-sectional view through another example of a known HP turbine NGV aerofoil cooling scheme, showing an arrangement of sheet metal impingement tubes inserts, and has already been described.
Figure 3B:
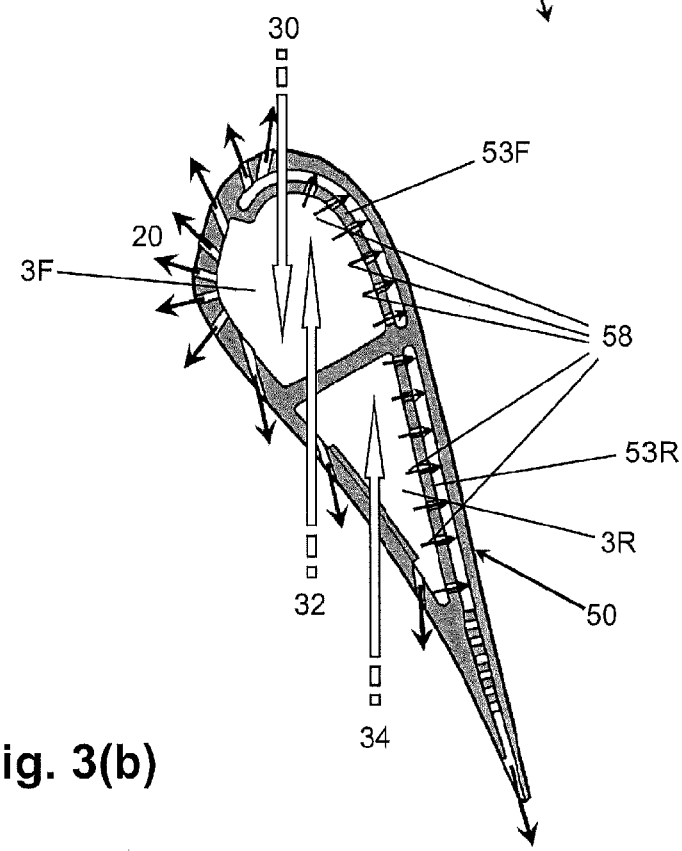
FIG. 3(b) is a cross-sectional view through another example of a known HP turbine NGV aerofoil cooling scheme, showing an alternative arrangement employing an additional internal cast wall located in close proximity to the suction side walls of the aerofoil, and has already been described.

In the detailed description which follows, reference numerals referring to like or corresponding parts or features in the various embodiments are designated as such using essentially the same reference numerals but appropriately incremented by 100 going from one embodiment to the next.

In comparison with known designs of NGVs and other gas turbine engine components which utilise internal cooling schemes, in developing the present invention the inventors recognised that there may be substantial benefits to be had if the pressure drop across the combustor of the engine ($P_{30}$-$P_{40}$) were to be reduced relative to current levels.

Figure 4A:
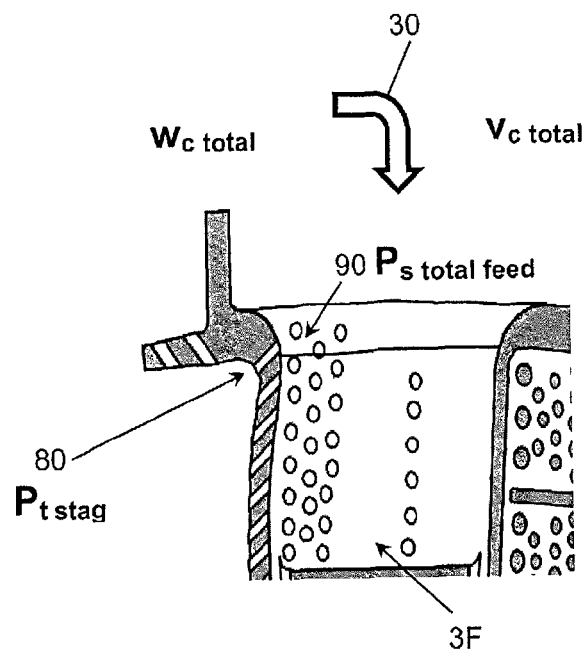
FIGS. 4(a) and 4(b) are, respectively, an axial cross-sectional explanatory view and a transverse (top plan) sectional view of part of an inlet portion of any of the NGV cooling chambers of FIGS. 1 to 3, showing the geometry thereof and the main parameters governing its operation.
Figure 4B:
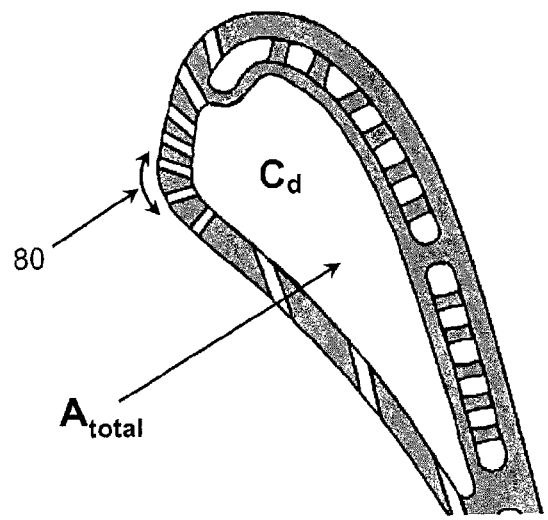

As shown in FIGS. 4(a) and 4(b), in the context of known NGVs employing showerhead cooling, the critical locations from a safe pressure margin viewpoint are the showerhead cooling holes located on either side of the aerofoil stagnation point 80 (or more correctly the stagnation region or zone, when considering unsteady flow). Typically the first row of holes to the pressure side (P/S) of the aerodynamic stagnation point 80 is where the local external pressure is at its highest value, and equal to the total pressure $P_{t40}$ when considering the unsteady effects. When this peak external pressure is coupled with the local minimum pressure internally, then the lowest pressure ratio across the holes exists. The minimum internal pressure occurs at the entrance(s) to, i.e. in the inlet portion(s) 90 of, the forward cooling chamber 3F, where the local coolant flow rate is greatest. Hence the local internal velocity is at its highest value and the corresponding static pressure $P_s$ is at its minimum value. Thus, in the arrangement illustrated in FIGS. 4(a) and 4(b) the following conditions are satisfied:

$$P_t = P_s + \tfrac{1}{2}\rho v^2$$

and therefore:

$$P_s = P_t - \tfrac{1}{2}\rho v^2,$$

$$v_{total} = [W_c/A\rho C_d]_{total},$$

and $$v \downarrow \gg P_s \uparrow,$$

where: $P_s$=static pressure, $P_t$=total pressure, $\rho$=fluid (i.e. air) density, v=local velocity, $C_d$=discharge coefficient, $W_c$=coolant mass flow, and A (or $A_{flow}$)=flow area.

Since in the arrangement of FIGS. 4(a) and 4(b) there is only one (outboard) feed passage 30 supplying cooling air to the cooling chamber 3F, then additionally:

$$V_{local} = [W_c/A\rho C_d]_{total}.$$

In order to keep the local velocity v at the cooling chamber inlet portion or entrance low, the local "mass flow per unit area" [$(W_c/A_{flow})_{local}$] needs to be kept at a low level.

If the safe backflow pressure margin is such that:

Pressure Margin=(($P_{s\ local}$-$P_{40}$)$P_{40}$)×100%, and which is typically in the range of from 1.5 (or about 1.5) to about 2.0%, and is allowed to drop significantly below these values, then there is an increased risk of hot gas ingestion into the cooling chamber 3F, which can and often will have catastrophic consequences.

Similarly, having a pressure margin significantly above about 2.0% may not be beneficial from a leakage and engine efficiency viewpoint, and may also increase the gas temperature at a design thrust level, which may therefore exacerbate the situation.

In accordance with the present invention in its broadest aspects therefore, the present inventors have identified a simple change to the cooling air feed geometry that improves the local backflow pressure margin without increasing the pressure drop across the combustor or increasing the size or shape or cross-sectional area of the aerofoil locally. This is achieved by introducing the above-defined partitioning element into the inlet portion of the cooling chamber via which the cooling air is fed thereinto from the respective feed source.

Figure 5A:
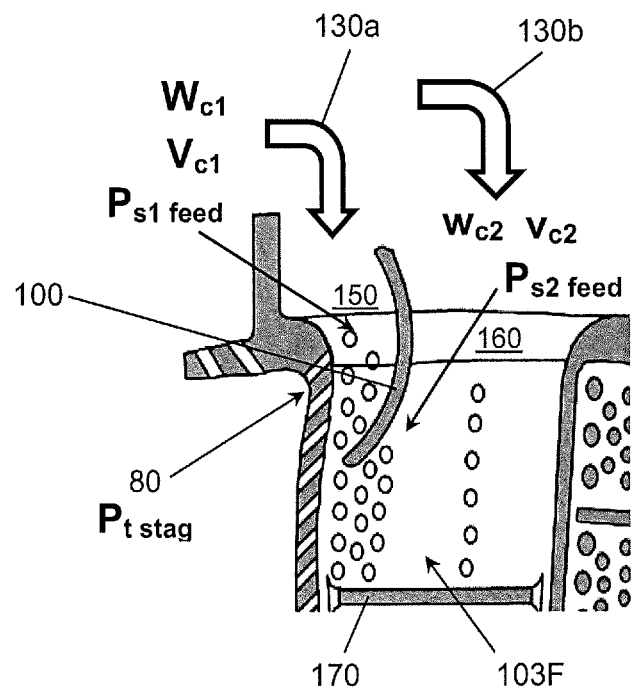
FIGS. 5(a) and 5(b) are, respectively, an axial cross-sectional explanatory view and a transverse (top plan) sectional view (corresponding to the views of FIGS. 4(a) and (b)) of part of an inlet portion of an NGV cooling chamber including a partitioning element in accordance with a first embodiment of the present invention, showing the geometry thereof and the main parameters governing its operation.
Figure 5B:
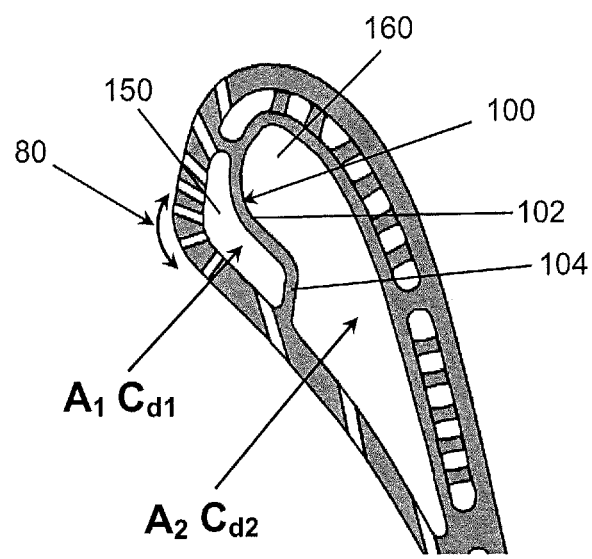

In its simplest form, a first embodiment of the invention is shown in FIGS. 5(a) and 5(b), which show diagrammatically the geometry of the new arrangement according to this embodiment. Mounted within the inlet portion of the chamber 103F is a partitioning element 100, which is in the form of a curved, arcuate or scoop-shaped plate or sheet (e.g. of the same or a compatible metal or alloy as used to cast the NGV side walls). The new partitioning element 100 divides the inlet portion of the cooling chamber 103F into two sub-chambers: a primary sub-chamber 150 which is located forwardly immediately adjacent the leading edge portion of the NGV (and thus adjacent the stagnation zone 80) and a secondary, rearward located, sub-chamber 160 which carries the remainder of the cooling air feed into the cooling chamber 3F. A sheet metal (e.g. planar) baffle plate 170 is located slightly below mid-span within the cooling chamber 3F. As shown schematically in FIG. 5(a), the partitioning element 100 extends a short distance, e.g. from about 10 or 20 or 30 up to about 50% of its height, axially upwardly and partially into the feed passage itself. It also extends axially downwardly into the main body of the cooling chamber 103F itself by a like or similar short distance. The partitioning element 100, e.g. in the form of a sheet, plate or wall, preferably of the same metal or alloy as is used to cast the walls of the component itself, has a generally concave shape/configuration in an axial section (as shown in FIG. 5(a)) and an arcuate or convoluted shape/configuration in a transverse section (as shown in FIG. 5(b)). The convoluted shape may for example be derived from a mid-portion 102 (relative to a width direction of the element) having a generally arcuate or concave shape, which is bounded on at least one lateral side by a or a respective connection portion 104 via which the element is attached to the component side wall. The element 100 is mounted in the chamber inlet portion by virtue of being united integrally with the component side cast walls, e.g. by being cast integrally therewith or being attached thereto by post-production welding or suchlike.

In the arrangement of this first embodiment as illustrated in FIGS. 5(a) and 5(b), the local feed pressure of the forward sub-chamber 150 is therefore governed by the following equations:

$$P_{s1\ feed} = P_t - \tfrac{1}{2}\rho v_{c1}^2$$

and $$v_{c1} = [W_{c1}/A_1\rho C_{d1}].$$

Hence if:

$W_{c1}/A_1$ is less than $W_{c\ total}/A_{total}$, then:

$v_{total} > V_{c1}$ and therefore:

$P_{s1\ feed} > P_{s\ total\ feed}$ and $v_1 = [W_c/A\rho C_d]_1 < v_{total} = [W_c/A\rho C_d]_{total}$, where the various subscripts represent the following:
- $_1$=forward sub-chamber 150,
- $_2$=rear sub-chamber 160,
- $_c$=coolant (air),
- $_{stag}$=stagnation value,
- $_{feed}$=at entrance to cooling chamber (i.e. in inlet portion thereof),
- $_t$=total value.

In general if the value of [feed area of the sub-chamber 150/number of holes it supplies] is greater than the value of [total feed area/number of hole it supplies], then the static feed pressure will rise above that with a single feed chamber into the NGV interior chamber.

As shown in FIG. 5(a), the partitioning element 100 locally creates a pair of sub-chambers 150, 160 which are both smaller in transverse section than the original cooling chamber 103F at its entrance. However, although the forward sub-chamber 150 adjacent the aerofoil leading edge has a smaller flow area than the overall inlet feed passage at the chamber's entrance, it only supplies cooling air to a reduced number of showerhead cooling holes. Therefore the flow per unit area is decreased relative to the value for the original geometry, i.e. in the absence of the partitioning element 100 but with the otherwise same arrangement and feed flow parameters. Thus the local air flow velocity in the forward sub-chamber 150 is reduced and the corresponding local static pressure therein is increased above the value for the original geometry, i.e. for the same arrangement and flow parameters but in the absence of the partitioning element 100.

The local backflow pressure margin across the showerhead portion of the NGV will thus be increased as a consequence of the change in geometry arising from the presence of the partitioning element 100. This increase can be beneficial in several ways. For example, it may enable there to be a reduced pressure drop across the combustor. Alternatively or additionally it may be used to increase the pressure drop across an impingement baffle plate or wall located or mounted within the cooling chamber 103F to improve the "back-face" impingement heat transfer. Further alternatively or additionally, it may be used simply to achieve the desired pressure margin across the showerhead portion without the need for increasing the local aerofoil shape. Any or all of these benefits may lead to improved efficiency of the gas turbine (or other) engine, which ultimately may manifest itself in improved specific fuel consumption (SFC), among possibly other benefits.

Figure 6A:
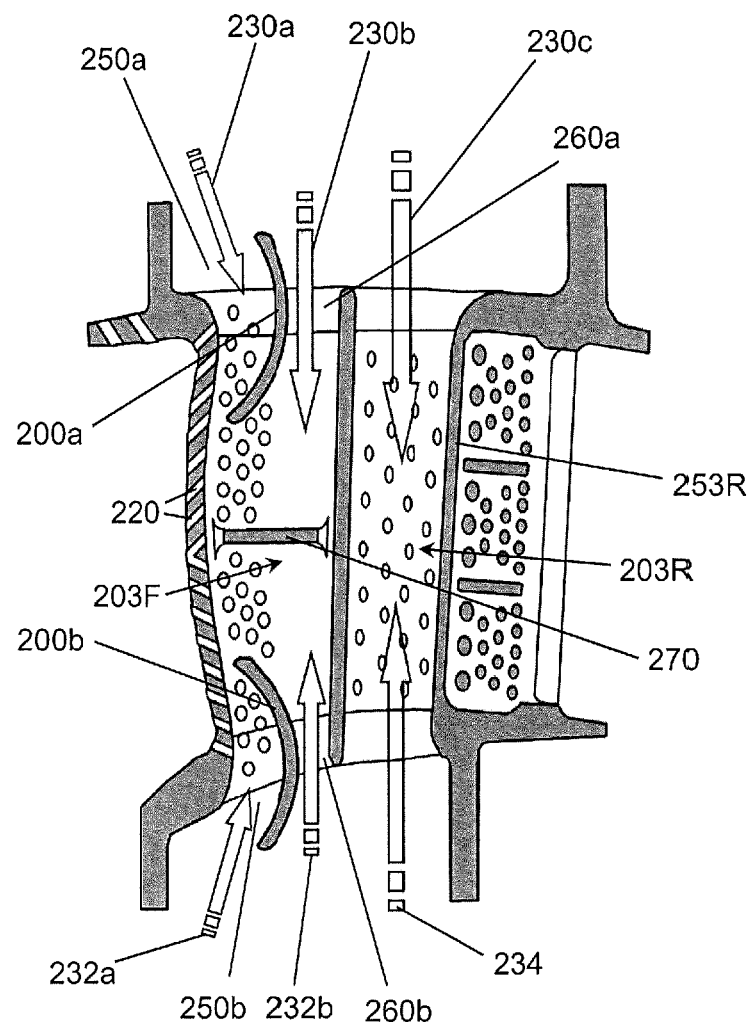
FIGS. 6(a), 6(b) and 6(c) are, respectively, an axial cross-sectional view, a transverse (top plan) sectional view, and a perspective orthogonal view of a dual-feed NGV including a pair of partitioning elements in accordance with a second embodiment of the present invention.
Figure 6B:
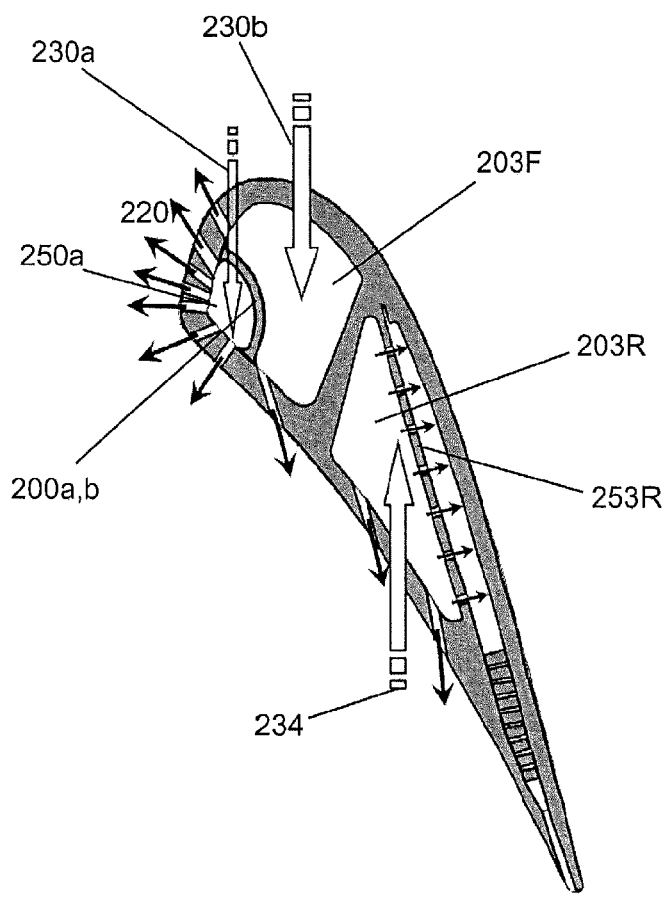
Figure 6C:
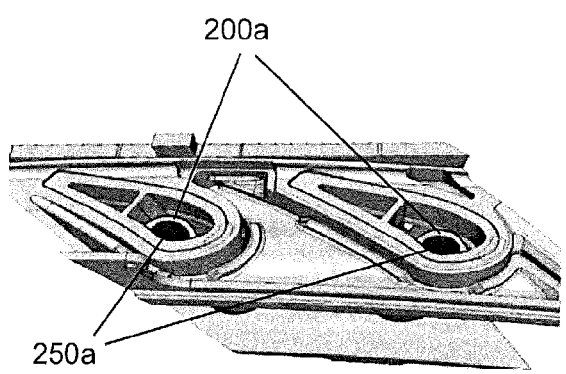

FIGS. 6(a), 6(b) and 6(c) show a second embodiment of the invention, in which a HPT NGV aerofoil cooling arrangement comprises a dual-end cooling air feed supplying cooling air from both outboard 230 and inboard 232, 234 sources to the forward cooling chamber 203F. Mounted generally centrally within and across the width of the chamber 203F is a planar baffle plate 270. Mounted within the rear cooling chamber 203R is impingement plate 253R, adjacent the rear suction-side side wall of the rear chamber 203R. A first partitioning element 200a is provided in the outboard inlet portion of the forward chamber 203F (i.e. that fed from the outboard cooling air feed source 230) and a second partitioning element 200b is provided in the inboard inlet portion of the forward chamber 203F (i.e. that fed from the inboard cooling air feed source 232). Each partitioning element 200a, 200b thus defines a respective forward sub-chamber 250a, 250b, which are fed from, respectively, outboard 230a and inboard 232a sources, and a respective rearward sub-chamber 260a, 260b, which are fed from, respectively, outboard 230b and inboard 232b sources.

Because the forward sub-chambers 250a, 250b each have a respective partitioning element 200a, 200b incorporated into both the inboard and outboard feed systems, the showerhead cooling holes 220 close to the entrances to the chamber 203F are supplied by air that passes through the respective forward sub-chambers 250a, 250b adjacent the leading edge of the aerofoil. Similarly, the showerhead cooling holes 220 closer to the mid-span locations are fed from the respective rearward sub-chambers 260a, 260b also defined within the forward cooling chamber 203F by the respective partitioning elements 200a, 200b.

In order to optimise the geometry of the arrangement it may be necessary or advantageous to locate each respective partitioning element 200a, 200b in a position where the local feed pressure in each respective forward sub-chamber 250a, 250b is identical at the first cooling hole 220 supplied by these sub-chambers 250a, 250b.

Note also that the curved shape of the respective partitioning elements 200a, 200b is designed to reduce the inlet $C_d$ (discharge coefficient) or losses at the respective entrances to the respective forward sub-chambers 250a, 250b. However, this may not be mandatory.

Figure 7:
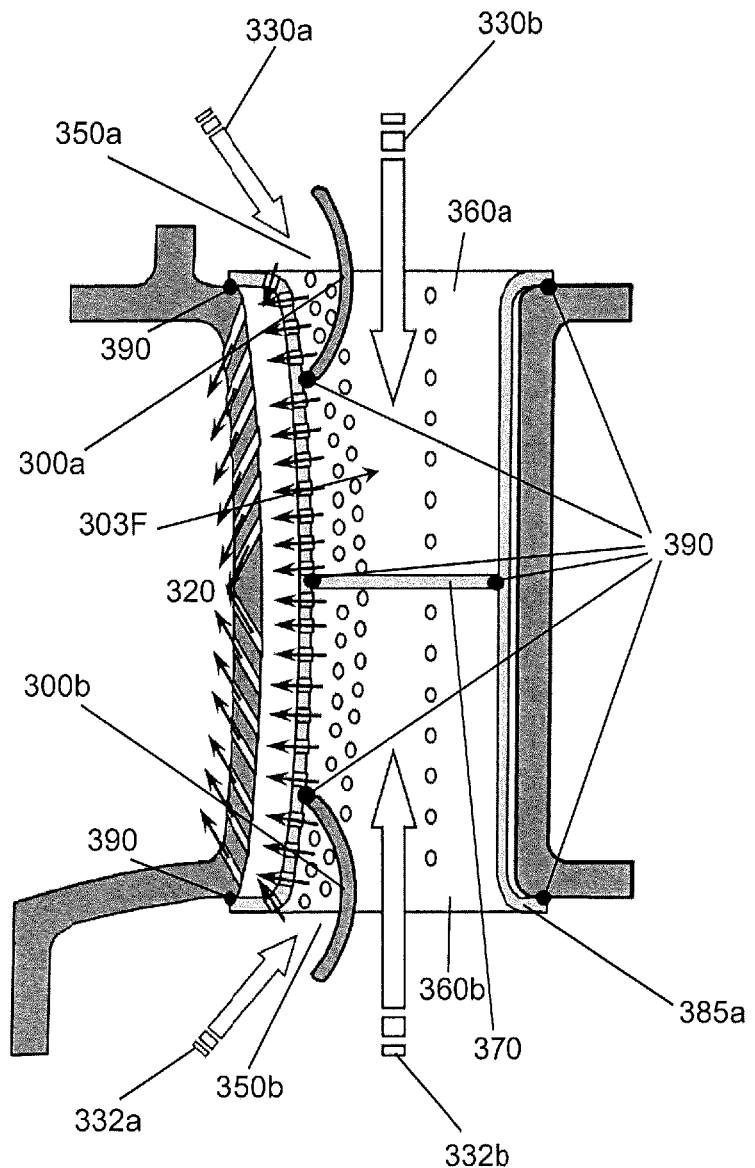
FIG. 7 is an axial cross-sectional view of a further dual-feed NGV including a pair of partitioning elements in accordance with a third embodiment of the invention.

FIG. 7 shows a third embodiment, which is a HPT NGV aerofoil cooling arrangement with a dual-end feed to a sheet metal insert tube 385a fitted into the forward cooling chamber 303F. There are provided an array of impingement holes in the leading edge wall of the insert tube 385a. The insert tube 385a also has a sheet metal (e.g. planar) baffle plate 370 located slightly below mid-span. The insert tube 385a is mounted in the forward cooling chamber 303F and supported therein by pin-fins 381 (like those labelled 481 in the alternative embodiment of FIG. 8) cast onto the internal walls of the NGV casting. Cooling air enters the insert tube 385a from one or both ends (inboard and/or outboard) and is then bled through an array or series of rows of holes in the insert tube 385a, impinging onto the internal walls of the casting, where the pin-fins 481 provide additional turbulent mixing of the cooling air. The cooling air then passes out of the various internal cooling sub- and mini-chambers onto the external surface of the aerofoil through a series of rows of film cooling holes.

Located at the outboard and inboard entrances to the insert tube 385a adjacent the leading edge are respective ones of a pair of partitioning elements 300a, 300b. These partitioning elements 300a, 300b take the form of curved, scoop-shaped sheet metal elements which are attached to the forward insert tube 385a by laser welded joints 390, which may help to reduce separation of the critical air flows and may improve any inlet pressure losses. In operation a proportion of coolant air passes into the respective forward sub-chambers 350a, 350b adjacent the leading edge, each of which feeds a respective proportion of the showerhead cooling holes 320 close to the insert tube entrance, while the remainder of the cooling air flows 330b, 332b feeds the larger rearward sub-chamber 360a, 360b within the insert tube 385a. By balancing the flow per unit area of each forward sub-chamber 350a, 350b with each other and with that of the rearward sub-chambers 360a, 360b, the respective backflow pressure margins may be balanced and thus the scheme optimised.

Figure 8:
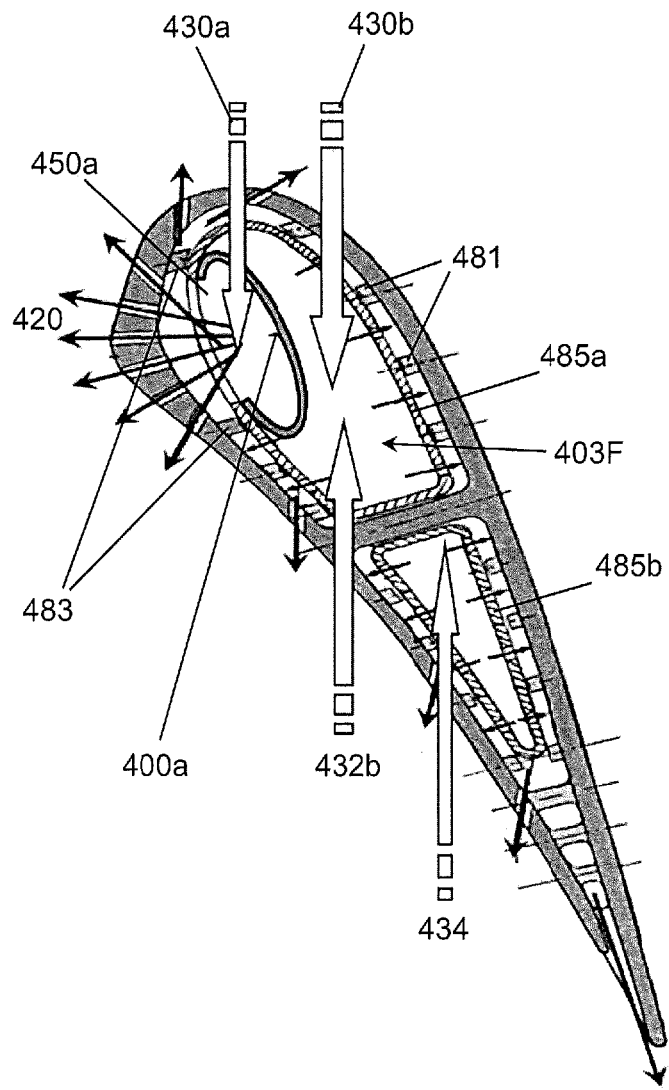
FIG. 8 is a transverse (top plan) sectional view of a further dual-feed NGV including a pair of partitioning elements in accordance with a fourth embodiment of the invention.

FIG. 8 shows a fourth embodiment, which for the most part is substantially the same as or closely corresponds to that of FIG. 7. As in the embodiment of FIG. 7, the insert tube 485a is mounted in the forward cooling chamber 403F and supported therein by pin-fins 481 cast onto the internal walls of the NGV casting. It should be noted here that the supporting features 483 on either side of the leading edge forward sub-chambers 450a, 450b are not pin-fins, but continuous walls that seal the respective forward sub-chambers 450a, 450b, allowing them to be maintained at a higher pressure than the other mini-chambers or passages immediately adjacent the forward suction-side and pressure-side walls, as defined by the insert tube 485a. However the arrangement of FIG. 8 is slightly different from that of FIG. 7. Here, instead of the array of impingement holes in the leading edge of the insert tube 485a, in the embodiment of FIG. 8 the arrangement has a single row of large holes feeding the leading edge cavity. Generally, the plural impingement holes option of FIG. 7 may be favoured in practice when adequate feed pressure is available to provide jet cooling and adequate backflow pressure margin(s) to prevent hot gas ingestion into the cooling chamber 303F/403F.

Figure 9A:
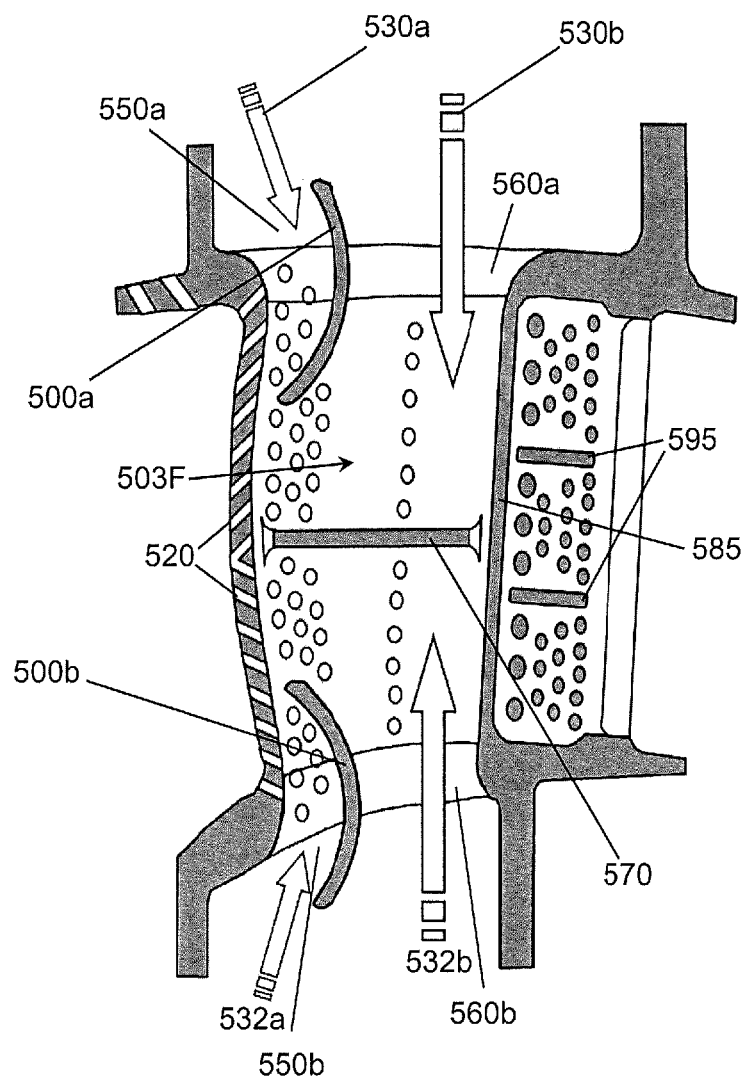
FIGS. 9(a) and 9(b) are, respectively, an axial cross-sectional view and a transverse (top plan) sectional view of yet another dual-feed NGV including a pair of partitioning elements in accordance with a fifth embodiment of the invention.
Figure 9B:
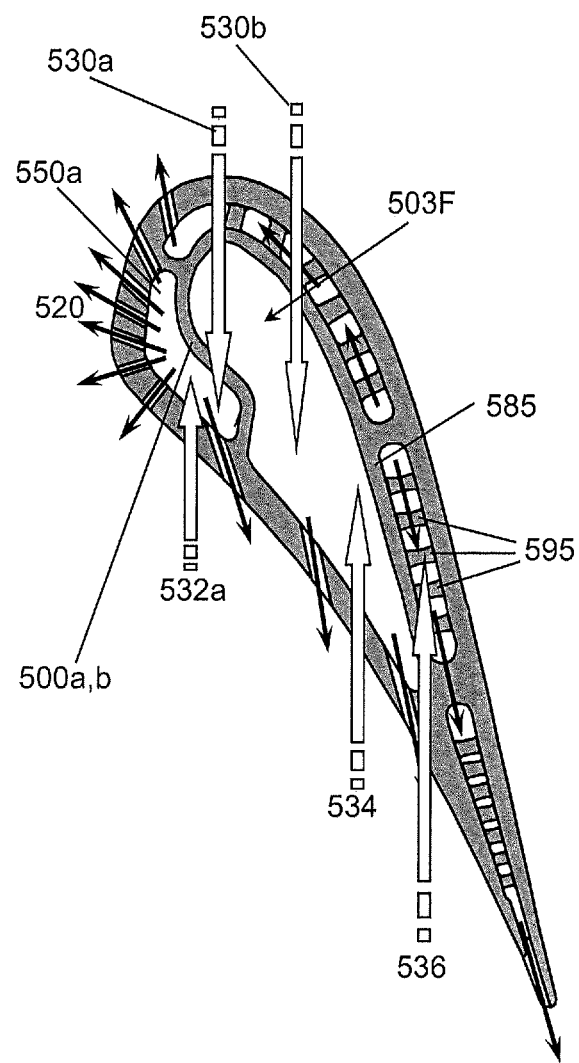

FIGS. 9(a) and 9(b) show a fifth embodiment, this being a "Wall Cooled" HPT NGV aerofoil cooling scheme. This cooling scheme again has a dual-feed forward cooling passage 503F supplying the leading edge showerhead holes 52Q and the pressure-side film cooling rows. The suction-side and trailing edge are separately fed—typically from an inboard source 536, which tends to be less contaminated—and the coolant air flows forward to the suction-side film cooling holes, and rearward to the trailing edge. The suction-side of the aerofoil is convectively cooled and the heat transfer rates are augmented using banks of pedestals 595 cast into the thin suction-side core wall 585, and film-cooled by spent coolant bled from the early suction-side films.

The pressure-side cavity has a cast-in, preferably planar, baffle plate arrangement 570 to prevent blow-through from occurring which may reduce the local static pressure to dangerously low levels. In order to improve the "backflow pressure margin" a pair of partitioning elements 500a, 500b according to the invention are located at the respective entrances (outboard and inboard) to the forward cooling chamber 503F, adjacent the leading edge portion thereof. Each partitioning element 500a, 500b is similarly shaped to that in other embodiments described above, in particular the embodiment of FIG. 5(b), although other shapes are of course possible. In this embodiment however each partitioning element 500a, 500b is not sealed to the sidewall. The forward sub-chambers 550a, 550b supply coolant air to the showerhead cooling holes 220 at the extremities, i.e. close to the end-walls or entrances to the respective sub-chambers 550a, 550b. As in the other embodiments described above, the walls of the respective partitioning elements 500a, 500b are curved in order to reduce the pressure losses due to the sharp curvature at the entrances to the respective forward sub-chambers 550, 550b. In operation a proportion of coolant air passes into the forward sub-chambers 550a, 550b adjacent the leading edge and feed a proportion of the showerhead cooling holes 520 close to the entrances to the respective forward sub-chambers 550a, 550b, while the remainder of the cooling air flow feeds the larger rearward sub-chambers 560a, 560b. Again, by balancing the flow per unit area of each forward sub-chamber 550a, 550b with each other and that of the rear sub-chambers 560a, 560b, the respective backflow pressure margins may be balanced and thus the scheme optimised.

As will already be apparent at least in part from the foregoing description, embodiments of the present invention may give rise to any one or more of several advantages over the prior art. For example:

- The use of the new partitioning element(s) may achieve reduced local coolant flow velocity at or close to the entrance to the forward cooling chamber by reducing the local "mass flow per unit area" values ($W_c/A_{flow})_{local}$.
- The ($W_c/A_{flow})_{local}$ values may be reduced by introducing the new partitioning element(s) adjacent the leading edge portion of the component, especially the showerhead cooling holes (where employed). This (or each respective) newly created leading-edge (especially forward) sub-chamber feed passage within the existing forward cooling chamber only supplies approximately 10% of the total L/E showerhead flow; however the local flow area of the forward sub-chamber is greater than 20% of the total feed passage area of the forward cooling chamber. Therefore, the $W_c/A_{flow})_{local}$ value for the forward sub-chamber is kept at a lower level, ensuring that the local velocity is low and the static pressure remains at a high level close to the total feed pressure.
- The newly-created forward (L/E) sub-chamber(s) feed passages ideally may be incorporated into both inboard and outboard feed source locations which supply the forward cooling chamber, when a dual feed system is present in the cooling scheme design.
- By carefully balancing the quantity of coolant air entering each of the forward (L/E) sub-chambers with respect to its flow area, and/or balancing those flows with the quantity of coolant air entering the respective rearward sub-chambers (i.e. the main feed passage flow into the cooling chamber) with respect to its feed area, the minimum pressure margin can be arranged to exist in both forward (L/E) and rearward (main) sub-chambers. This combination may therefore give the minimum feed pressure required whilst ensuring that the minimum backflow pressure margin is achieved.
- The benefits of the pressure recovery system described may be utilised in one or more of the following ways:
  (a) For reducing the pressure drop across the combustor ($P_{30}$-$P_{40}$).
  (b) For reducing the local thickness of the aerofoil section.
  (c) Using the additional feed pressure to increase the local internal heat transfer at the aerofoil leading edge. This may be achieved by increasing the pressure ratio across the impingement cooling jets incorporated into the L/E feed cavity.

Any one or more of the above improvements may ultimately improve the efficiency of the engine (e.g. gas turbine engine) and thus ultimately may improve the engine's SFC (specific fuel consumption).

Moreover, the potential benefits of reducing the combustor pressure drop may be potentially very significant. A typical modern civil aircraft gas turbine engine combustor may have a pressure drop across it in the range of from about 2.3 to 2.7%, where:

Combustor Pressure Drop=$\{(P_{30}-P_{40})/P_{30}\}\times 100[\%]$.

Typical exchange rates suggest that a 1% change in percentage pressure drop is equivalent to 0.25 to 0.33% SFC.

Whilst the described embodiments relate to the specific case of a nozzle guide vane, the skilled person will appreciate the inventive concept may also be applied to other components. For example (but without limitation) a turbine blade, a shroud or a hub which suffers the problems addressed by the invention.

Whilst the specific embodiments relate to a vane having a forward and rearward channel, the invention is equally applicable to vanes having a single cooling chamber or a plurality of cooling chambers which is greater than 2.

It is to be understood that the above description of embodiments and aspects of the invention has been by way of non-limiting examples only, and various modifications may be made from what has been specifically described and illustrated whilst remaining within the scope of the invention as defined in the appended claims.

Throughout the description and claims of this specification, the words "comprise" and "contain" and variations of the words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Furthermore, features, integers, components, elements, characteristics or properties described in conjunction with a particular aspect, embodiment or example of the invention are to be understood to be applicable to any other aspect, embodiment or example described herein, unless incompatible therewith.

The invention claimed is:

1. A nozzle guide vane or turbine blade of a gas turbine engine, the nozzle guide vane or turbine blade comprising:
    at least one internal cooling chamber for passage of cooling air, the at least one cooling chamber including: (i) a leading edge portion, and (ii) at least one inlet portion through which cooling air enters the at least one cooling chamber from a feed source; and
    a partitioning element disposed in the at least one inlet portion of the at least one cooling chamber and extending into the at least one cooling chamber to define a sub-chamber wholly or partly within the at least one cooling chamber, the partitioning element and the leading edge portion constitute boundaries of the sub-chamber, the sub-chamber having an inlet configured to receive cooling air from the feed source, the partitioning element including:
        an axially outer portion, relative to a longitudinal axis of the at least one cooling chamber, extending into an inlet feed passage through which cooling air enters the at least one inlet portion of the at least one cooling chamber from the feed source; and
        an end portion distal to the inlet feed passage in the at least one cooling chamber bending towards the leading edge portion of the at least one cooling chamber at a short axial distance from the inlet feed passage, such that the partitioning element reduces a cooling air velocity in the sub-chamber to a value smaller than a cooling air velocity in a remainder of the at least one inlet portion of the at least one cooling chamber.

2. The nozzle guide vane or turbine blade as claimed in claim 1, further comprising a forward cooling chamber and a rearward cooling chamber, and the partitioning element is provided in the forward cooling chamber.

3. The nozzle guide vane or turbine blade as claimed in claim 1, wherein the leading edge portion includes a showerhead portion, the sub-chamber defined by the partitioning element being adjacent the showerhead portion.

4. The nozzle guide vane or turbine blade as claimed in claim 1, wherein the partitioning element is mounted in at least the inlet portion of the cooling chamber by being formed integrally with side walls of the nozzle guide vane or turbine blade by casting the partitioning element as an integral internal wall portion of the nozzle guide vane or turbine blade.

5. The nozzle guide vane or turbine blade as claimed in claim 1, wherein the partitioning element is mounted in the inlet portion of the cooling chamber and attached to an inner side wall of the nozzle guide vane or turbine blade.

6. The nozzle guide vane or turbine blade as claimed in claim 1, wherein the cooling chamber contains an insert tube including impingement holes in the insert tube, the impingement holes being configured to feed cooling air to the leading edge portion, and the partitioning element is mounted and attached to an inner side wall of the insert tube.

7. The nozzle guide vane or turbine blade as claimed in claim 1, wherein the partitioning element is a body, plate, wall, member or element having a cross-section or a face adjacent to the leading edge portion.

8. The nozzle guide vane or turbine blade as claimed in claim 1, wherein the partitioning element is provided in the inlet portion of the at least one cooling chamber, whereby a single sub-chamber is defined adjacent the leading edge portion of the at least one cooling chamber.

9. The nozzle guide vane or turbine blade as claimed in claim 1, wherein a plurality of the partitioning elements are provided in at least the inlet portion of the at least one cooling chamber, such that a plurality of sub-chambers are defined in the at least one cooling chamber.

10. The nozzle guide vane or turbine blade as claimed in claim 1, wherein the at least one cooling chamber has a plurality of inlet portions, and each of the plurality of inlet portions is provided with a respective one of a plurality of the partitioning elements.

11. A gas turbine engine including one or more internally cooled nozzle guide vanes or turbine blades, each being the nozzle guide vane or turbine blade as claimed in claim 1.

12. The nozzle guide vane or turbine blade as claimed in claim 1, wherein the partitioning element is mounted in at least the inlet portion of the at least one cooling chamber by manufacturing the partitioning element as a discrete element and subsequently mounting the partitioning element in the nozzle guide vane or turbine blade at a desired location by welding.

13. The nozzle guide vane or turbine blade as claimed in claim 1, wherein the partitioning element is a body, plate, wall, member or element having a cross-section or a face adjacent to the leading edge portion of the at least one cooling chamber, which includes two or more substantially flat sections angled with respect to each other in one or more orthogonal directions.

14. The nozzle guide vane or turbine blade as claimed in claim 1, wherein the partitioning element is a body, plate, wall, member or element having a cross-section or a face adjacent to the leading edge portion of the at least one cooling chamber, which is scoop shaped.

15. The nozzle guide vane or turbine blade as claimed in claim 1, wherein the partitioning element is a body, plate, wall, member or element having a cross-section or a face adjacent to the leading edge portion of the at least one cooling chamber, which is partially cylindrical in at least one orthogonal direction.

16. A method of cooling a leading edge portion of a nozzle guide vane or turbine blade of a gas turbine engine, the nozzle guide vane or turbine blade having at least one internal cooling chamber for passage of cooling air, the least one cooling chamber including a leading edge portion and at least one inlet portion through which cooling air enters the at least one cooling chamber from a feed source, the method comprising:

providing a partitioning element in the inlet portion of the at least one cooling chamber that extends to define a sub-chamber, bound by the partitioning element and the leading edge portion, wholly or partly within the at least one cooling chamber, the sub-chamber having an inlet configured to receive cooling air from the feed source, the partitioning element including: (i) an axially outer portion, relative to a longitudinal axis of the at least one cooling chamber, extending into an inlet feed passage through which cooling air enters the at least one inlet portion of the cooling chamber from the feed source; and (ii) an end portion distal to the inlet feed passage in the at least one cooling chamber bending towards the leading edge portion of the at least one cooling chamber at a short axial distance from the inlet feed passage, such that the partitioning element reduces a cooling air velocity in the sub-chamber to a value smaller than a cooling air velocity in a remainder of the at least one inlet portion of the at least one cooling chamber; and when in use, cooling the nozzle guide vane or turbine blade by feeding cooling air from the feed source into both the sub-chamber and the remainder of the at least one cooling chamber.

* * * * *